Dec. 15, 1931.  J. A. PAASCHE  1,836,986
HOSE COUPLING AND THE LIKE
Filed May 18, 1927
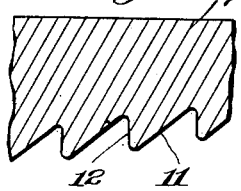
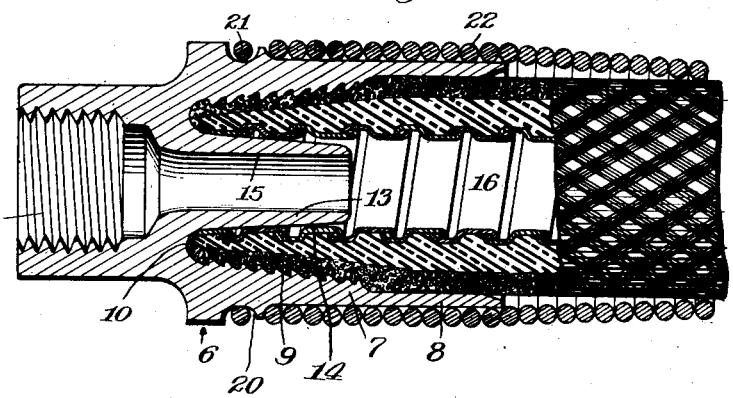
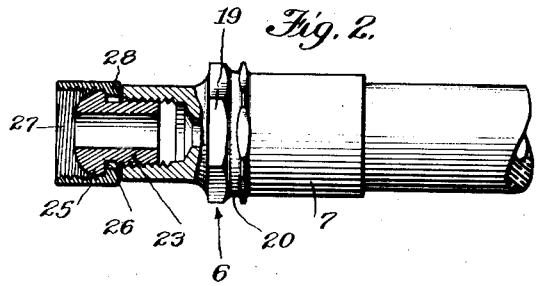
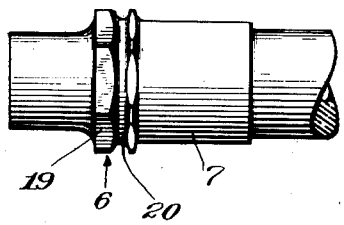
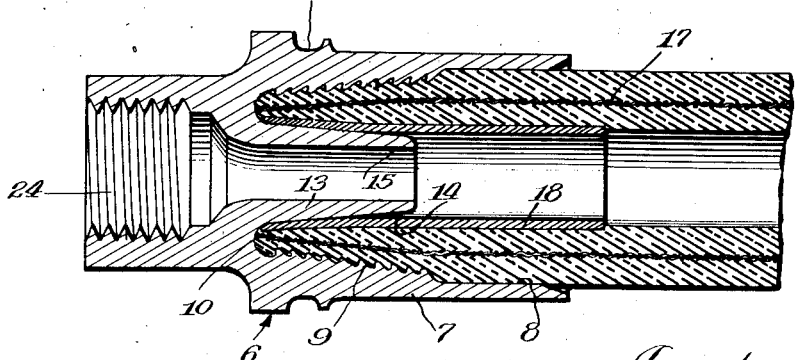
Inventor
Jens A. Paasche
By Tho. A. Bennig
Attys.

Patented Dec. 15, 1931

1,836,986

UNITED STATES PATENT OFFICE

JENS A. PAASCHE, OF WILMETTE, ILLINOIS

HOSE COUPLING AND THE LIKE

Application filed May 18, 1927. Serial No. 192,386.

This invention has to do with improvements in hose couplings. It has reference to couplings for hose of various sizes; but the features of invention herein disclosed are very well adapted for the coupling of hose of medium and small sizes such as are used to supply air and liquid for air brushes air guns and similar apparatus. In mentioning these particular uses of the invention I do not intend to thereby in any respect restrict the usefulness of the invention since these uses are mentioned merely by way of illustration and not for the purpose of limitation.

The main object of the invention is to provide a coupling of such construction that the end portion of the hose will be very effectively and firmly grasped by the coupling and with a minimum amount of damage to the end portion of the hose itself. This result is accomplished by a coupling construction having a series of interior threads of sawtooth formation which are adapted to most effectively and readily grip the end portion of the exterior of the hose.

The foregoing result is also accomplished and enhanced by the provision of a circular, relatively deep recess which receives the end portion of the hose, said recess tapering in width so that as the end portion of the hose is forced therein the gripping and sealing action is constantly improved.

The foregoing circular relatively deep recess is established by the provison of a central outwardly facing axial nipple which is separated from the exterior or body portion of the coupling member. This nipple is adapted to enter into and firmly engage the end portion of the bore of the hose, thus not only affording a support for said bore to prevent the end portion of the hose from collapsing, but also establishing a central support or seat against which the material of the hose is compressed due to the tapering nature of the recess.

The coupling herein disclosed is economical to manufacture, easy and fast to attach and detach, and very well adapted for use with armoured hose, that is, hose having a central re-inforced and supporting armour. When the coupling is used with such hose as the foregoing said nipple projects within and directly supports the armour aforesaid. The coupling may also be readily used with unarmoured hose. In this case the nipple may directly receive the interior surface of the bore of the hose; or a relatively short section of metal tubing may be initially set into the end portion of the bore of the hose, said tubing serving to support the hose and also serving to make direct engagement with the nipple aforesaid.

Other objects and uses of the invention will appear from a detailed description of the same which consists in the features of construction and combinations of parts hereinafter described and claimed.

In the drawings:

Figure 1 shows an exterior side view of a coupling set in place onto the end of the hose;

Fig. 2 shows a view similar to that of Fig. 1, with the exception that the coupling is provided with an extension nipple to form a union joint, these parts being shown in section;

Fig. 3 shows a longitudinal section through the coupling of Fig. 1 having applied thereto a hose having a permanent interior armour;

Fig. 4 shows a view similar to that of Fig. 3 with the exception that the hose is not provided with any interior armour, but in place thereof there is substituted a length of reinforced tube for the end portion of the bore of the hose; and Fig. 5 shows a fragmentary longitudinal section of the form of interior threads for engaging the exterior surface of the hose itself, the same being shown on greatly enlarged scale.

Referring first to Figs. 3 and 4 in particular, the coupling includes a circular body member 6, having a longitudinally extending cylindrical shell portion 7. This shell portion is provided with a central inwardly reaching bore, the outer portion 8 of which is preferably straight and smooth, acting as a supporting sleeve or shield and guide to prevent breakage at threaded portion of "screwtight" coupling, and of the proper size to receive the hose free and loose without binding or clamping. The inner portion 9 of the said bore tapers slightly in size to its extreme inner end 10 and said portion 9 is threaded as is clearly shown in Figs. 3 and 4. This threaded portion 9 is of slightly smaller size than the unthreaded portion 8 so that as the hose is forced home to crowd itself against the inner end 10 of the bore, the hose is gripped with continually increasing force until the parts are finally completely sealed against leakage and engaged.

The threads 9 are preferably of the general form shown in detail in Fig. 5. They are provided with relatively easy sloping, outwardly facing tapers 11 and with the abrupt inwardly facing surfaces 12. As a consequence the hose may be screwed into place by the application of a relatively easy force, but if the hose has once been forced home in this manner it cannot be readily withdrawn by the direct force of the air or fluid from the inside. Its gripping action is so intense that the hose will burst before it can blow away from the screwtight coupling.

In order to give support to the interior of the end portion of the hose I provide an inwardly reaching central nipple 13 which is secured to or comprises a portion of the body member 6 adjacent to the inner end 10 of the bore. This nipple is preferably provided with a tapering exterior surface 14 so that as the hosing is forced into place the nipple 13 will wedge itself into the bore or hose; but the amount of this taper is relatively slight so that the hose may be forced inwards for a very substantial distance without the creation of an excessive amount of binding action. The interior of the nipple is preferably provided with a straight bore 15 of ample capacity to carry the full volume of fluid transmitted by the hose.

It will be noted that the exterior surface 14 of the nipple co-operates with the interior surface 9 of the main bore to establish the desired annular recess for the accommodation of the end portion of the hose; and that said recess tapers slightly in size as its inner end 10 is approached. Also that the exterior wall 9 of said recess is threaded so as to effectively grip the outside surface of the hose, whereas the inner surface of said recess is plain so as to allow the hose to be cramped into place without unnecessary damage.

The hose illustrated in Fig. 3 is provided with an interior armour 16 of familiar and well-known form. When an armoured hose is used the armour thereof will wedge easily onto the outer surface of the nipple 13 and without material damage to the bore of the hose itself. Furthermore, this armour will give effective support to the interior of the hose so as to hold the same against collapsing under the external pressure created by the tapering form of the bore 9. Such support being in addition to that afforded by the nipple 13 itself.

In Fig. 4 I have illustrated my coupling as applied to a hose 17 which hose is not provided with any armour. In this case the surface of the bore may be allowed to come into direct contact with the nipple 13, but preferably there is provided a short reinforced nipple 18 in the end of the bore of the hose. This nipple 18 when used is forced into the bore of the hose as shown in Fig. 4, and thereafter when the coupling is applied to the hose the nipple 18 will work easily over the surface of the nipple 13, thus affording a more ready application of the coupling to the hose and also strengthening the hose itself and protecting it against unnecessary damage.

If desired, the body 6 of the coupling may be provided with suitable facets 19 to establish a nut whereby the coupling can be readily gripped by a wrench or other similar tool. In this connection there is preferably also provided an encircling groove 20 at the position of the facets or nut thus established, said groove 20 being intended to receive the end convolution 21 of a short section of wire re-inforcing 22 which may be slipped over the hose before the coupling is attached to the hose. Thereafter this flexible wire member 22 may be slipped back and simultaneously turned or rotated on the hose and coupling so as to run it along over the outer surface of the coupling until its end convolution 21 may be threaded over and into the groove 20. This wire member 22 when used will give the hose a sufficient amount of support immediately beyond the position of the coupling to largely prevent sharp bending of the hose immediately adjacent to the coupling. This will effectively prevent cracking and damage to the hose at this point.

In case it be desired to use the coupling as a universal coupling, an extension nipple 23 may be threaded into the outer bore 24 of the coupling member 6. This extension nipple 23 is provided with an end enlargement 25 which establishes a shoulder 26. A collar 27 has at its inner end an interior flange 28 which takes against the shoulder 26 in the manner readily apparent from Fig. 2. When the collar 27 is threaded onto another member such as a section of pipe, it will draw up solid against the shoulder 26 so as to make an effective seal at that point.

While I have herein shown and described only a certain embodiment of my present invention, still it will be understood that I do not intend to limit myself thereto except as I may do so in the claim.

I claim:

As a new article of manufacture a hose coupling for the purpose specified comprising a cylindrical body member having a cylindrical bore reaching inwardly from one end, the outer end portion of said bar having a smooth surface and being of a size suitable to receive the hose with which the coupling is intended to be used, and the inner portion of said bore tapering gradually to a smaller size at its inner end, said tapering portion being provided with an internal thread having the outwardly facing surfaces thereof formed on an easy slant and the inwardly facing surfaces thereof abrupt to thereby permit the material of the hose to be threaded easily into said tapered portion and effectively resist direct withdrawal of the hose from the coupling, an axial nipple integrally formed with the coupling and reaching axially along beneath said threaded portion, said nipple having a central bore for the passage of fluid, and having its external surface tapering gradually to larger size at its inner end where said surface joins the inner threaded end aforesaid to establish an abutment for the end of the hose, the nipple together with said interior threaded portion establishing an annular recess of tapering size for accommodation of the end portion of the hose substantially as described.

JENS A. PAASCHE.